Sept. 11, 1962     C. H. DEAL     3,053,970
WELDING IMPLEMENT
Filed Nov. 25, 1960     2 Sheets-Sheet 1
FIG. 1.
FIG. 2.
FIG. 3.
FIG. 4.
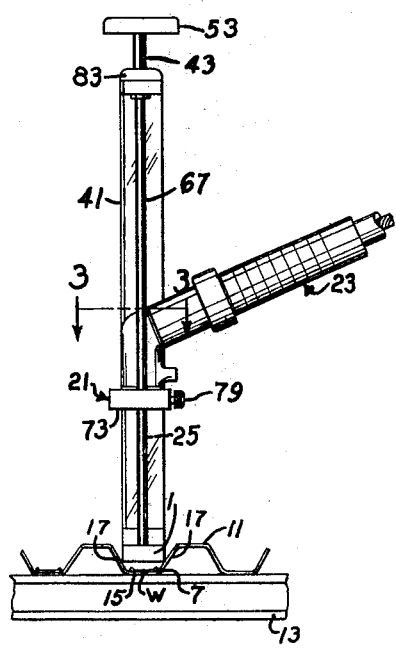
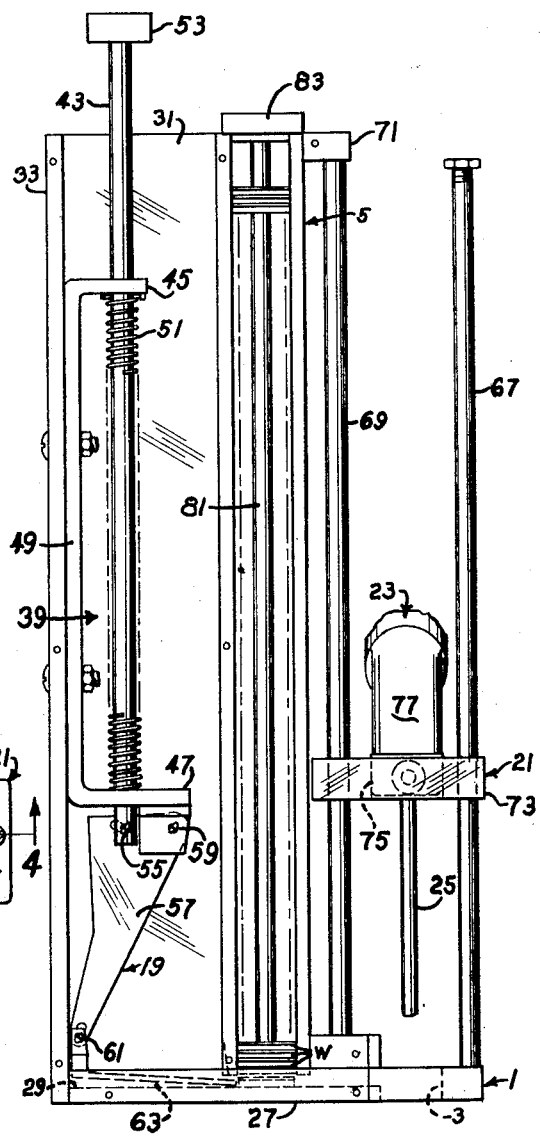
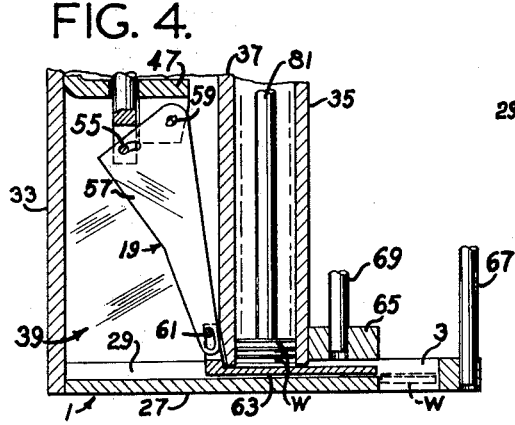
Cletis Henry Deal,
Inventor.
Koenig and Pope,
Attorneys.

Sept. 11, 1962 C. H. DEAL 3,053,970
WELDING IMPLEMENT

Filed Nov. 25, 1960 2 Sheets-Sheet 2

Cletis Henry Deal,
Inventor.
Koenig and Pope,
Attorneys.

United States Patent Office 3,053,970
Patented Sept. 11, 1962

3,053,970
WELDING IMPLEMENT
Cletis Henry Deal, 5008 Columbia St., St. Louis, Mo.
Filed Nov. 25, 1960, Ser. No. 71,793
3 Claims. (Cl. 219—103)

This invention relates to welding implements, and more particularly to an implement for facilitating the placement and welding of metal welding washers in the erection of permanent steel forms for the pouring of concrete floors and roof slabs.

In the erection of structures having poured concrete floors or roof slabs corrugated steel sheet is often used as a permanent form for the pouring of the concrete. Such sheet is supported on a structural metal framework, and is welded to the framework. For example, a sheet may be supported on steel beams, and is welded to the beams. In this type of construction, a steel welding washer is applied to the corrugated steel sheet at each weld point to provide additional metal thickness for plug welding through the hole in the washer and the sheet to a beam. Among the several objects of this invention may be noted the provision of a welding implement for facilitating the placement of the washers and the welding operations, the implement including a magazine for holding a supply of washers from which one washer may be ejected at a time into position for welding; and the provision of an implement of this class which is of relatively inexpensive construction and easy to use. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is an end elevation of a welding implement of this invention showing how it is used;

FIG. 2 is a side elevation of the implement, on a larger scale than FIG. 1, with a side cover plate broken away to show interior detail, and with the handle of a welding electrode holder broken away;

FIG. 3 is a horizontal cross section taken on line 3—3 of FIG. 1, on the scale of FIG. 2;

FIG. 4 is a vertical section taken essentially on line 4—4 of FIG. 3, showing a moved position of parts as regards FIG. 2;

Corresponding reference characters indicate corresponding parts throughout the several views of the drawings.

Figure 5:
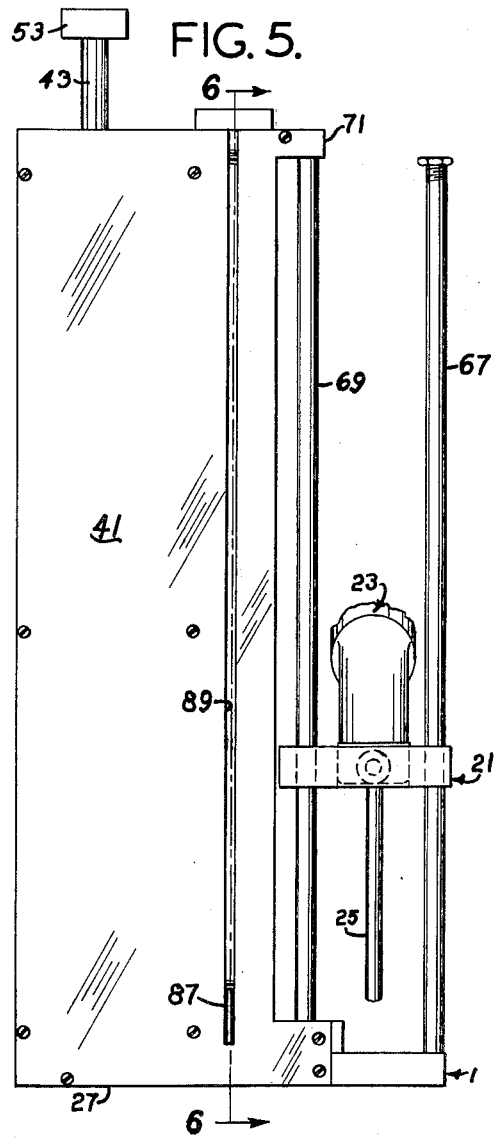
FIG. 5 is a left side elevation of FIG. 1 on the scale of FIG. 2.

Referring to the drawings, a welding implement made in accordance with this invention is shown to comprise a base 1 adapted to be placed on the work to be welded and having a vertical opening 3 therein. At 5 is indicated a magazine for holding a vertical stack of metal washers W. As shown by way of example in FIGS. 1 and 3, each washer W consists of a rectangular piece of steel having upturned angled wings 7 and a center hole 9. Washers of this type are used in welding corrugated steel sheet such as indicated at 11 in FIG. 1, used as a form for a poured concrete floor or roof slab where the sheet bears on a structural support 13 (such as a steel beam). The washers are positioned in the troughs of the corrugated steel sheet over the structural supports to provide additional metal thickness for plug welding through the holes in the washers and through the steel sheet to the support. As appears in FIG. 1, the corrugated sheet is such that each trough thereof has a flat horizontal bottom 15 and inclined sides 17, and washer W is formed to fit within any trough with the central portion of the washer engaging the bottom of the trough and the wings of the washer engaging the inclined sides of the trough. Means indicated at 19 is provided for ejecting the lowermost washer W of the stack in the magazine into the opening 3, the ejected washer dropping down in the opening onto the bottom of the trough. Means indicated at 21 is provided for supporting a welding electrode holder 23 for vertical sliding movement with a welding electrode 25 extending downward from the holder and adapted to extend into the opening 3. Holder 23 may be of a type such as shown in U.S. Patents 2,364,507 and 2,364,508, for example.

The base 1 is of relatively long narrow rectangular shape (narrow enough to fit lengthwise in a trough of sheet 11 as appears in FIG. 1). It has a flat bottom 27. Opening 3 is located adjacent one end of the base, which may be referred to as its forward end. Opening 3 is illustrated as a rectangular opening, slightly larger than the outline of a washer W. The base 1 has a groove or channel 29 at the top extending lengthwise from its rearward end to the opening 3. This channel has the same width as the opening 3. Extending up from one of the long sides of the base is a vertical plate 31 which may be secured to the base in any suitable manner. This plate has a rear vertical flange 33 engaging the rearward end of the base. The width of the plate is less than the length of the base so that the forward end portion of the base with the opening 3 therein projects beyond the plate. At its forward edge, plate 31 has a vertical flange 35 which projects over the base. Rearward of flange 35, plate 31 has another vertical flange 37 projecting over the base. Flanges 35 and 37 constitute the forward and rearward walls of the magazine 5. The portion of plate 31 between flanges 35 and 37 constitutes a side wall of the magazine. The ejecting mechanism 19 is housed in the chamber 39 between flanges 33 and 37. A cover plate 41 (which may be removable) closes magazine 5 and chamber 39.

The ejecting mechanism 19 comprises a plunger 43 which is vertically slidable in holes in upper and lower horizontal flanges 45 and 47 of a C-shaped bracket 49 secured to the rear flange 33 of plate 31 in chamber 39. This plunger is biased upward by a spring 51. It extends up out of chamber 39 and has a knob 53 on its upper end. At its lower end below flange 47, plunger 43 has a pin connection at 55 with a lever 57 pivoted at 59 on flange 47. Lever 57 has a pin and slot connection 61 at its lower end with an ejector slide 63 which is slidable in channel 29 in the top of base 1. This slide 63 normally occupies a retracted position wherein its forward end is under the lower edge of flange 37 so that washers W stacked up in the magazine bear on the bottom of the channel. When plunger 43 is pushed down against the bias of spring 51, slide 63 is moved forward to push the lowermost washer in the stack forward, and when the plunger is released, the slide is returned to its retracted position. The washer pushed forward by the slide passes under a member 65 secured on top of base 1 in front of flange 35 spanning the channel 29 and is discharged into the opening 3.

The means 21 for supporting the electrode holder 23 comprises a rod 67 extending vertically upward from base 1 between the forward end of the base and the opening 3 and a rod 69 extending vertically upward from the member 65. The upper end of rod 69 is received in a hole in a lug 71 at the upper end of flange 35. A block 73 vertically slidable on the rods 67 and 69 has a hole 75 receiving the head 77 of the electrode holder. A set screw 79 is threaded in a tapped lateral hole in block 73 for securing the holder to the block. Hole 75 is generally vertically aligned with opening 3 in the base 1 so that electrode 25 extending down from the head 77 of the electrode holder is adapted to extend into the opening 3 coaxially with hole 9 in a washer W which has dropped down through opening 3.

Figure 6:
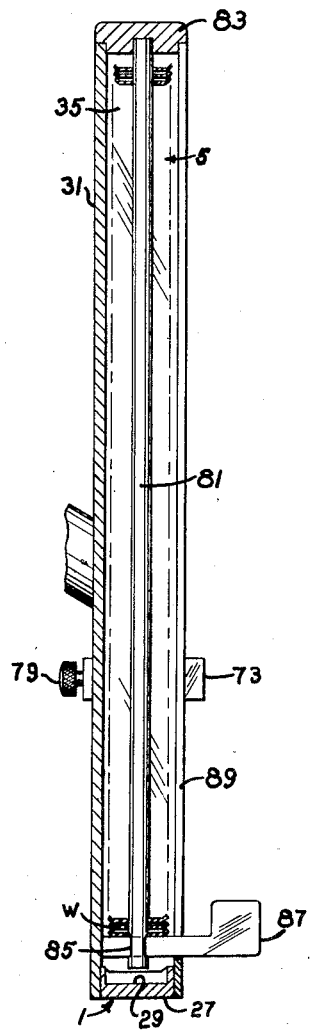
FIG. 6 is a vertical section taken on line 6—6 of FIG. 5.

To facilitate loading of the magazine 5 with washers W, a rod 81 is provided having a knob 83 at one end and a slot 85 adjacent its lower end. Washers are applied to the rod (which is received in the holes in the washers) and a key 87 (see FIG. 6) is inserted in the slot 85. Cover plate 41 has a vertical slot 89 extending down from the top between flanges 35 and 37 nearly to the bottom. Rod 81 with washers W therein is inserted in magazine 5, the key 87 being accommodated in slot 89. After insertion, the key is withdrawn so that the stack of washers in magazine 5 drops down onto the bottom of channel 29 in the base. The washers are stacked in nested relation and inserted with their wings positioned laterally as regards magazine 5 and base 1.

The welding implement is utilized by placing the base 1 in a trough of sheet 11 as appears in FIG. 1 with opening 3 in the base over a spot where the work is to be welded. Then, plunger 43 is pushed down, with resultant ejection of a washer W into the opening 3. This washer drops down through opening 3 into the bottom of the trough in position for welding. The electrode holder 23 may then be moved down to bring the tip of electrode into position for welding. It will be observed that the tip of the electrode is automatically positioned concentric with the hole in the washer for plug welding.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A welding implement comprising a base adapted to be placed on work to be welded, said base having a vertical opening therein, a magazine for holding a stack of washers extending upward from the base adjacent said opening, a rod extending downward in said magazine received in holes in the washers, said rod having a slot adjacent its lower end for receiving a key, and said magazine having a slot extending down from the top at one side thereof for receiving the key, means for ejecting the lowermost washer of the stack into said opening in the base, the ejected washer being adapted to drop down through said opening and onto said work, and means on said base for supporting a welding electrode holder for vertical sliding movement with an electrode extending downward from said holder in line with said opening in the base.

2. A welding implement comprising a base adapted to be placed on work to be welded, said base being of relatively long and narrow rectangular shape and having a vertical opening therein adjacent one end constituting its forward end, said base having a groove in the top extending forward to said opening, a magazine extending upward from the base rearward of said opening for holding a stack of washers with the lowermost washer in said groove, a slide for pushing the lowermost washer forward in said groove and into said opening, whereupon the washer drops down through said opening and onto said work, means for actuating the slide including a plunger extending upward from the base rearward of the magazine, said plunger being movable downward to move the slide forward and being spring-biased upward, and means for supporting a welding electrode holder for vertical sliding movement in front of said magazine with an electrode extending downward from said holder in line with said opening in said base.

3. A welding implement as set forth in claim 2 including a rod extending downward in said magazine received in holes in the washers, said rod having a slot adjacent its lower end for receiving a key, and said magazine having a slot extending down from the top at one side thereof for receiving the key.

References Cited in the file of this patent
UNITED STATES PATENTS 1,233,688     Murray et al. _____ July 17, 1917